United States Patent [19]
Oh

[11] Patent Number: 6,069,759
[45] Date of Patent: May 30, 2000

[54] METHOD FOR LAYING OUT AN ADAPTIVE ZONE OF A HARD DISK DRIVE

[75] Inventor: Heung-Min Oh, Suwon, Rep. of Korea

[73] Assignee: SamSung Electronics Co., Ltd., Suwon, Rep. of Korea

[21] Appl. No.: 08/885,735

[22] Filed: Jun. 30, 1997

[30] Foreign Application Priority Data

Jun. 28, 1996 [KR] Rep. of Korea ................. 96-25246

[51] Int. Cl.[7] ................................................. G11B 5/09
[52] U.S. Cl. ................................................. 360/51
[58] Field of Search .............................. 360/46, 51, 65

[56] References Cited

U.S. PATENT DOCUMENTS

| | | | |
|---|---|---|---|
| 4,799,112 | 1/1989 | Bremmer et al. | 360/51 |
| 5,535,186 | 7/1996 | Ishizawa | 369/124 |
| 5,543,978 | 8/1996 | Park | 360/46 |
| 5,563,746 | 10/1996 | Bliss | 360/53 |
| 5,585,975 | 12/1996 | Bliss | 360/65 |
| 5,768,320 | 6/1998 | Kovacs et al. | 360/46 |
| 5,822,142 | 10/1998 | Hicken | 360/53 |

FOREIGN PATENT DOCUMENTS 43 08 352 A1  9/1993  Germany.

OTHER PUBLICATIONS

IEEE Transactions on Magnetics, Vo. 29, No. 6, Nov. 1993, pp. 4021–4023.

*Primary Examiner*—Glenton B. Burgess
*Assistant Examiner*—Regina Y. Neal
*Attorney, Agent, or Firm*—Robert E. Bushnell, Esq.

[57] ABSTRACT

A method for laying out an adaptive zone of a hard disk drive adopting a partial response signalling and maximum likelihood (PRML) detection comprises the steps of obtaining a pulse width by reading an isolated pulse written on a disk as a recording medium, obtaining a channel bit period by calculating the ratio between the channel density according to PRML and the pulse width, and selecting the optimum zone data rate from a zone table to record it on a memory.

10 Claims, 6 Drawing Sheets

METHOD FOR LAYING OUT AN ADAPTIVE ZONE OF A HARD DISK DRIVE

CLAIM OF PRIORITY

This application makes reference to, incorporates the same herein, and claims all benefits accruing under 35 U.S.C §119 from an application entitled Method For Laying Out An Adaptive Zone Of A Hard Disk Drive earlier filed in the Korean Industrial Property Office on Jun. 28, 1996, and there duly assigned Ser. No. 96-25248 by that Office.

BACKGROUND OF THE INVENTION

1. Field of the Invention

The present invention relates to a hard disk drive adopting Partial Response signalling & Maximum Likelihood (PRML) detection, and more particularly to a method for laying out an adaptive zone by utilizing the pulse width of a signal read by a head.

2. Description of the Related Art

The mechanism of a hard disk drive widely used as an auxiliary memory device consists of a magnetic head to read or write data from or on a magnetic disk, a microprocessor, and a read/write channel circuit connected to the microprocessor.

In the read/write channel circuit of the hard disk drive, a peak detection method is adopted as a data pulse detection method due to the feature of magnetization inversion. Recently the method of partial response signaling & maximum likelihood detection (hereinafter referred to as 'PRML') originated from digital communication is applied to a hard disk drive due to demand for a hard disk drive of high speed and capacity, and accordingly the related technology has been researched actively. U.S. Pat. Nos. 5,585,975 and 5,563,746, both to Willaim G. Bliss, are examples of a read/write circuit using a PRML method and also teach the use of PR4, EPR4 and EEPR4 in a PRML method.

For making the most use of an advantage of the PRML, a read signal from disk should be passed through a specially designed equalization filter. The function of the equalization filter is to shape a wave utilized easily by a maximum likelihood sequence estimation detector (hereinafter referred to as 'MLSE'). The equalization filter is achieved by combining an analog filter and a digital filter, wherein the digital filter is adopted essentially and the quantity of tap of the filter is large enough for shaping a more correct wave.

I have determined that it is necessary to adjust the pulse width of a read signal for obtaining wanted sampling values at given sampling times. For this purpose, an equalizer is used in a hard disk drive adopting the PRML method. However the pulse width of a read signal is varied due to different features of each head when multiple platters are adopted as a way of increasing data capacity in a conventional hard disk drive and accordingly multiple heads are installed above the platters. The pulse width of the read signal from the head is varied according to the flying height of the head and the position of a track arrayed in concentric circles on a disk platter. And an error occurs by misequalization phenomenon when the pulse width of a signal read from the head is not adjusted. Hence, a number of data errors are caused in reading data in a hard disk drive adopting the conventional PRML method.

SUMMARY OF THE INVENTION

An object of the present invention is to provide a method for laying out an adaptive zone to optimize a pulse width of a read signal in a hard disk drive adopting the PRML method.

According to the present invention, a method for laying out an adaptive zone of a hard disk drive adopting a partial response signalling and maximum likelihood (PRML) detection, comprises the steps of obtaining a pulse width by reading an isolated pulse written on a disk as a recording medium, obtaining a channel bit period by calculating the ratio between the channel density according to PRML and the pulse width, and selecting the optimum zone data rate from a zone table to record it on a memory.

The present invention will now be described more specifically with reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
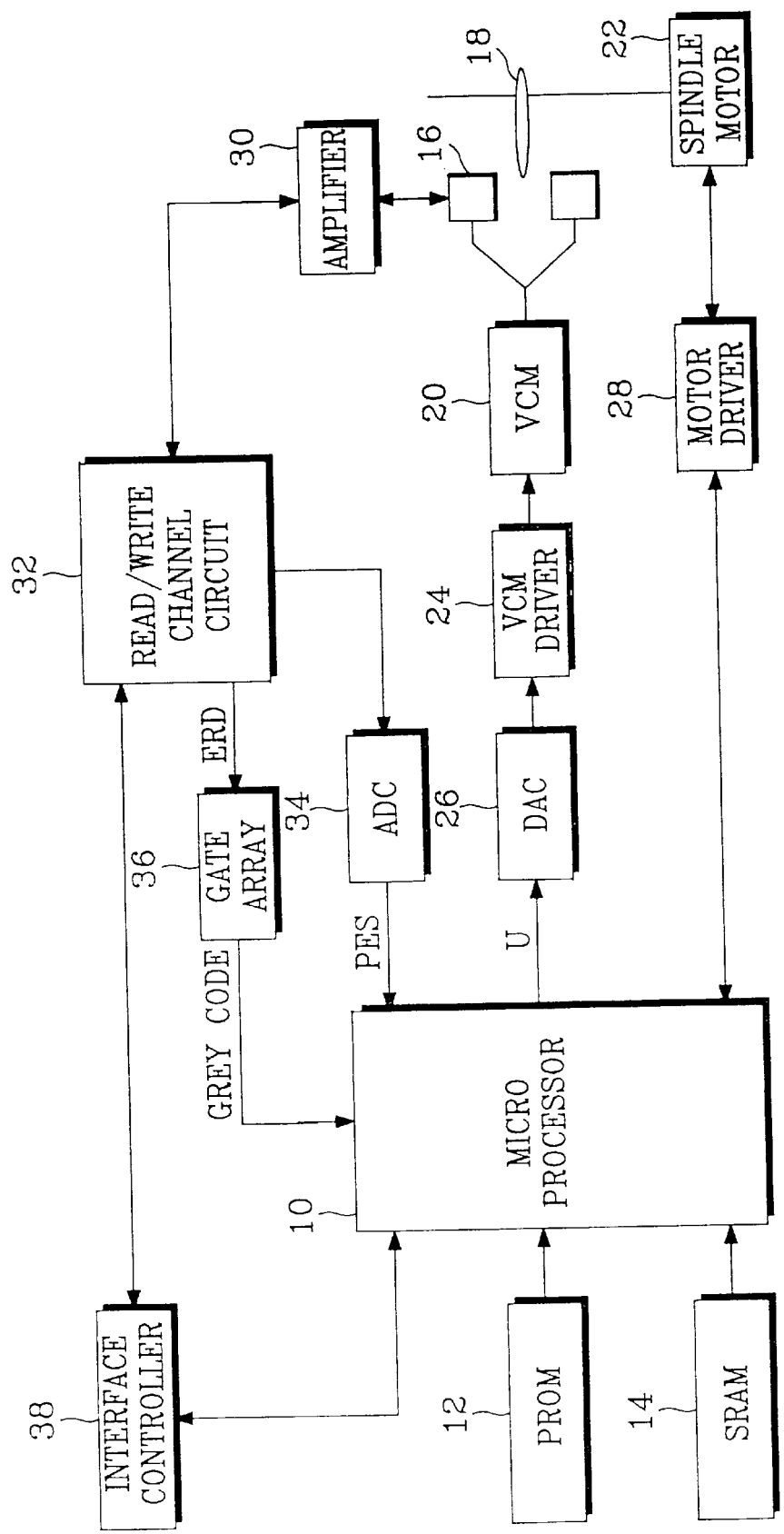
FIG. 1 illustrates a block diagram of a circuit for writing data to and reading data from a disk in a hard disk drive.

Referring to FIG. 1, a microprocessor 10 is connected to a static Random Access Memory (hereinafter referred to as 'SRAM') 14 and a programmable Read Only Memory (hereinafter referred to as 'PROM') 12 storing a prescribed control program of microprocessor 10 and a servo algorithm. A head 16 performs horizontal movement above a disk 18, and reads and writes on or from disk 18. Head 16 is connected to one end of an actuator, and a voice coil motor (hereinafter referred to as 'VCM') 20 connected to the other end of the actuator moves head 16 horizontally above disk 18. A spindle motor 22 rotates disk 18 connected to a drive shaft.

A VCM driver 24 connected to VCM 20 controls the movement of VCM 20. A digital-to-analog converter (hereinafter referred to as 'DAC') 26 connected to microprocessor 10 and VCM driver 24 receives a digital control input signal U from microprocessor 10 and transmits it to VCM driver 24 after converting U to an analog signal. A motor driver 28 is connected to spindle motor 22 and microprocessor 10 controls spindle motor 22 by control of microprocessor 10. An amplifier 30 connected to head 16 transmits a read signal from and transmits a write data signal to head 16 by amplifying it. An interface controller 38 receives and transmits data to and from an external data input device.

A read/write channel circuit 32 connected to microprocessor 10, amplifier 30 and interface controller 38 receives write data from interface controller 38 and transmits it to amplifier 30 by encoding it according to a prescribed code signal. Read/write channel circuit 32 transmits encoded read data (hereinafter referred to as 'ERD') by receiving an analog read signal from amplifier 30 and converting it to digital. ADC 34 connected to read/write channel circuit 32 transmits a servo reading signal to microprocessor 10 by converting an input analog signal to a digital signal. A gate array 36 connected to read/write channel circuit detects servo information such as a gray code of the servo area of disk 18 from the received ERD.

In read/write channel circuit 32 of the hard disk drive, a peak detection method is adopted as a data pulse detection method due to the feature of magnetization inversion, and the method of partial response signaling & maximum likelihood detection is applied to a hard disk drive due to demand for a hard disk drive.

Figure 2:
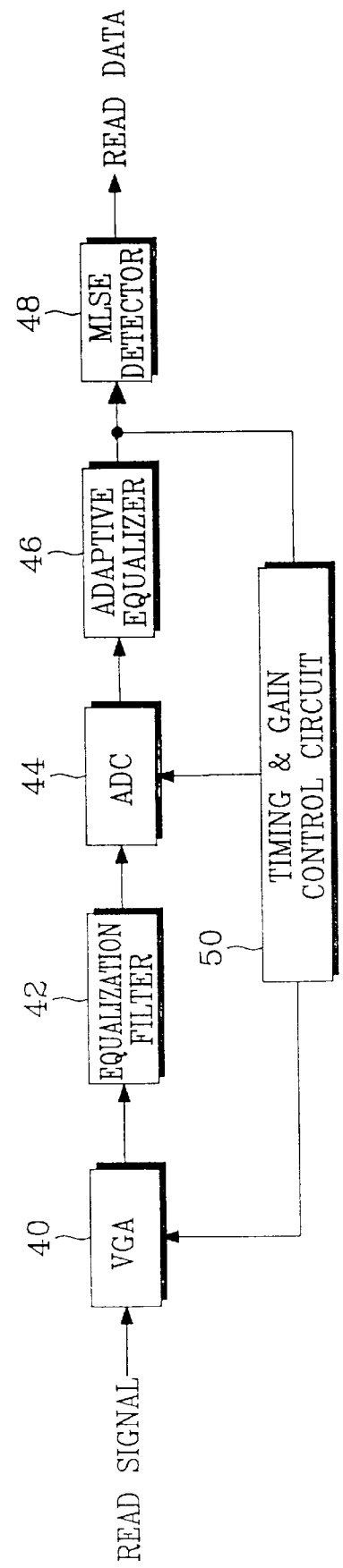
FIG. 2 illustrates a block diagram of a read channel circuit of a read/write channel circuit in a hard disk drive adopting PRML method.

Referring to FIG. 2 for illustrating a block diagram of a read channel circuit of a read/write channel circuit 32 adopting the PRML method, a variable gain amplifier (hereinafter referred to as 'VGA') 40 of the read channel circuit amplifies a signal read from head 16 by a fixed level by means of gain adjustment. An equalization filter 42 filters a noise of the amplified analog signal from VGA 40 and shapes pulse width. An analog/digital converter (hereinafter referred to as 'ADC') 44 samples the signal from equalization filter 42 according to a given sampling rate and transmits by converting it to digital signal. An adaptive equalizer 46 additionally equalizes the sampling value of the digital signal from ADC 44. An MLSE detector 48 obtains final read data by receiving a sampling value from adaptive equalizer 46 and decoding it as digital data. A timing and gain control circuit 50 connected between an output end of the adaptive equalizer 46 and the VGA 40 maintains system gain and clock phase. And the reliability of the final read data from the read channel circuit is affected by pulse width of a signal read from head 16 and the sampling rate.

Figure 3A:
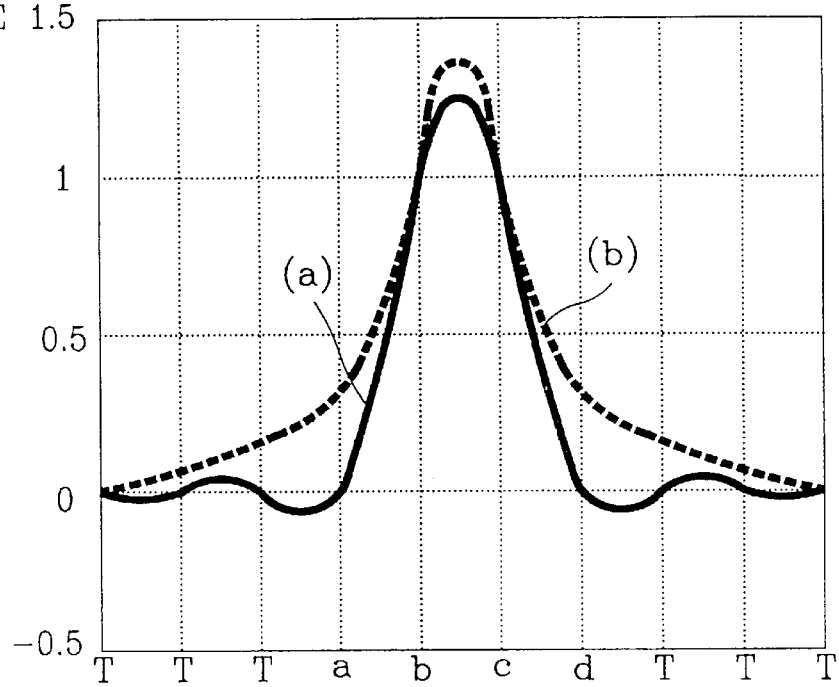
FIGS. 3A, 3B and 3C illustrates an example of a variety of isolated pulse widths for describing the reliability of output data of a read channel circuit adopting PRML method.
Figure 3B:
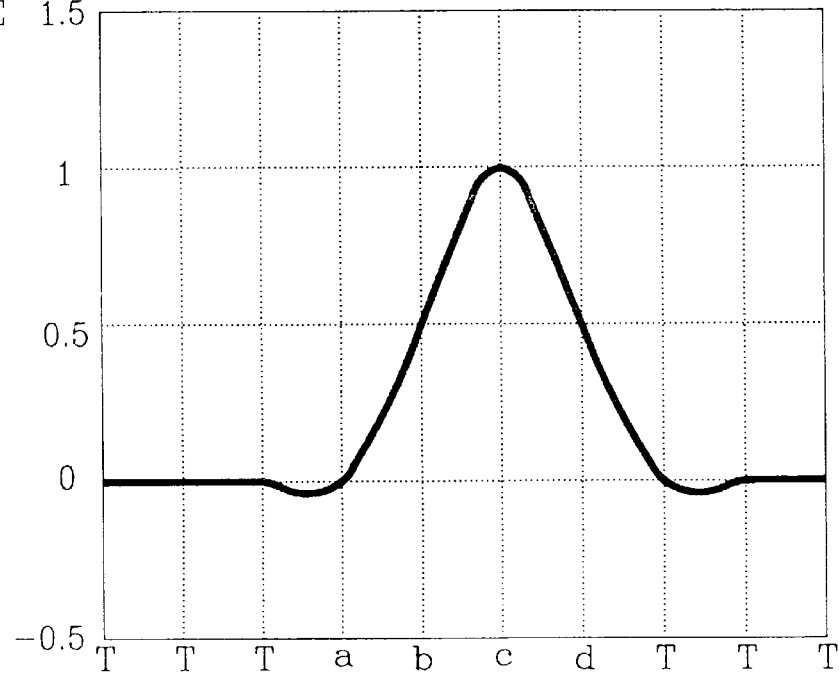
Figure 3C:
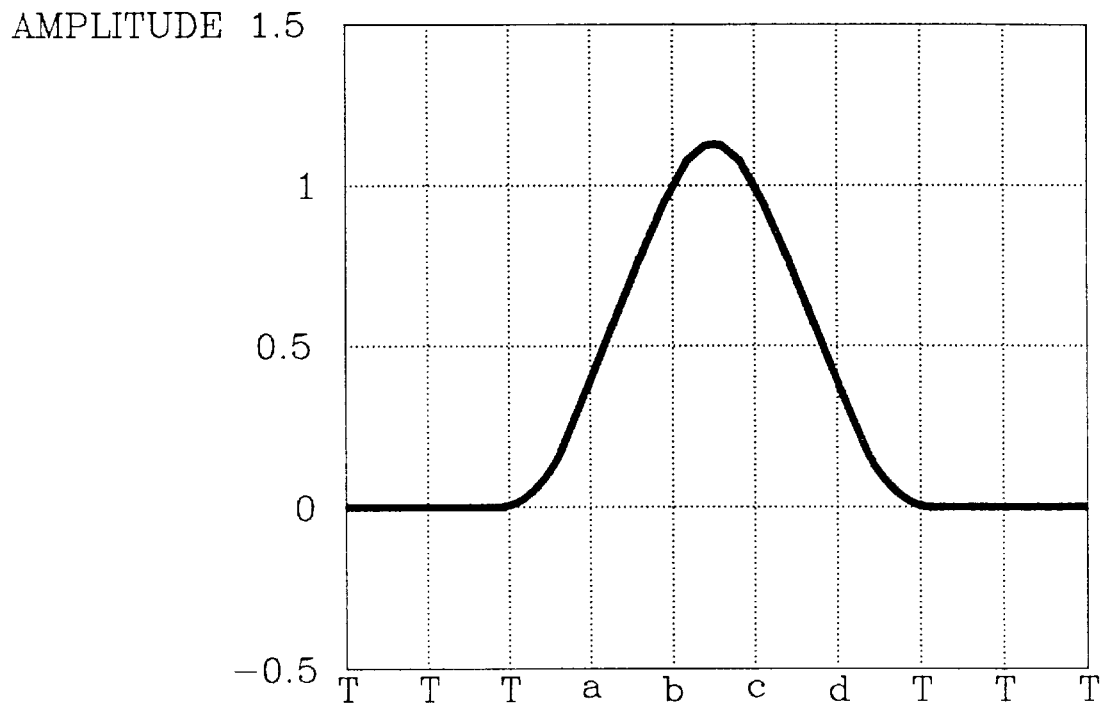

Referring to FIG. 3, the relation between the sampling time and the pulse width of a signal read from head 16 will be described with reference to the waveform of an isolated pulse according to PRML. FIGS. 3A, 3B and 3C represent each waveform of an isolated pulse in a partial response Class IV, PR4, system and extended partial response, EPR4 and EEPR4, systems according to a PRML method. The horizontal and vertical axis represent the sampling time T and the amplitude of a pulse in FIGS. 3A to 3C. In a PR4 system of FIG. 3A, each sampling value of the isolated pulse should be 0, 1, 1, and 0 at sampling times a, b, c and d, respectively, in an EPR4 system of FIG. 3B, each sampling value of an isolated pulse should be 0, 0.5, 1, 0.5 and 0 at sampling times a, b, c and d, respectively, and in an EEPR4 system of FIG. 3C, each sampling value of an isolated pulse should be 0, 0.33, 1, 1, 0.33 and 0 at sampling times a, b, c and d.

Accordingly it is required to adjust the pulse width of a read signal for obtaining wanted sampling values at given sampling times. For this purpose, an equalizer is used in a hard disk drive adopting the PRML method. However the pulse width of a read signal is varied due to different features of each head when multiple platters are adopted as a way of increasing data capacity in a conventional hard disk drive and accordingly multiple heads are installed above the platters. The pulse width of the read signal from head 16 is varied according to the flying height of head 16 and the position of a track arrayed in concentric circles on a disk platter. And an error source like the dotted line shown in FIG. 3A occurs by misequalization phenomenon when the pulse width of a signal read from head 16 is not adjusted because of the reasons described above. Hence, a number of data errors are caused in reading data in a hard disk drive adopting the conventional PRML method.

A zone layout of a hard disk drive is divided into many zones for maintaining constant density, which is possible by each zone's changing a data rate clock. Each zone has its own channel bit period (hereinafter referred as 'Tch') different from one another and maintains the pulse width of a read signal different from one another according to the zone radius of the disk. In this case, channel density (hereinafter referred to as 'Dch') is defined as follows:

$$Dch = PW50/Tch \ldots \quad (1)$$

Wherein PW50 represents the width of the isolated pulse at amplitude of 0.5. Consequently, the sampling value is changed as the Dch changes.

Figure 4:
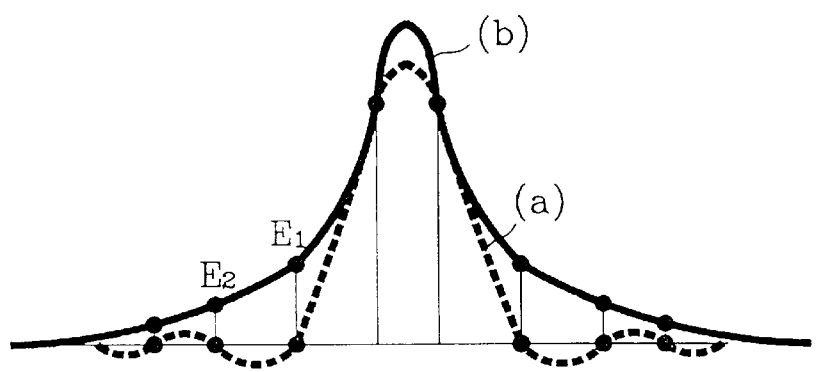
FIG. 4 illustrates an example of waveform of an isolated pulse for describing a sampling value changing according to changes of channel density in a read channel circuit adopting the PRML method.

Referring to FIG. 4, (a) illustrates an example of waveform of isolated pulse in PR4 system and (b) illustrates a waveform of error pulse occurred by misequalization phenomenon. E1 and E2 represent sampling values at prescribed sampling times and the sampling value is changed according to changes of channel density as shown in the following Table 1.

| Dch | E1[(Dch$^2$ + 1)/(Dch$^2$ + 9)] | E2[(Dch$^2$ + 1)/(Dch$^2$ + 25)] |
|---|---|---|
| 1.0 | 0.20 | 0.08 |
| 1.5 | 0.29 | 0.12 |
| 2.0 | 0.36 | 0.17 |
| 2.5 | 0.48 | 0.23 |

The Dch values 1.0, 1.5, 2.0 and 2.5 represent each peak detection method, PR4, EPR4, and EEPR4 in order.

Figure 5:
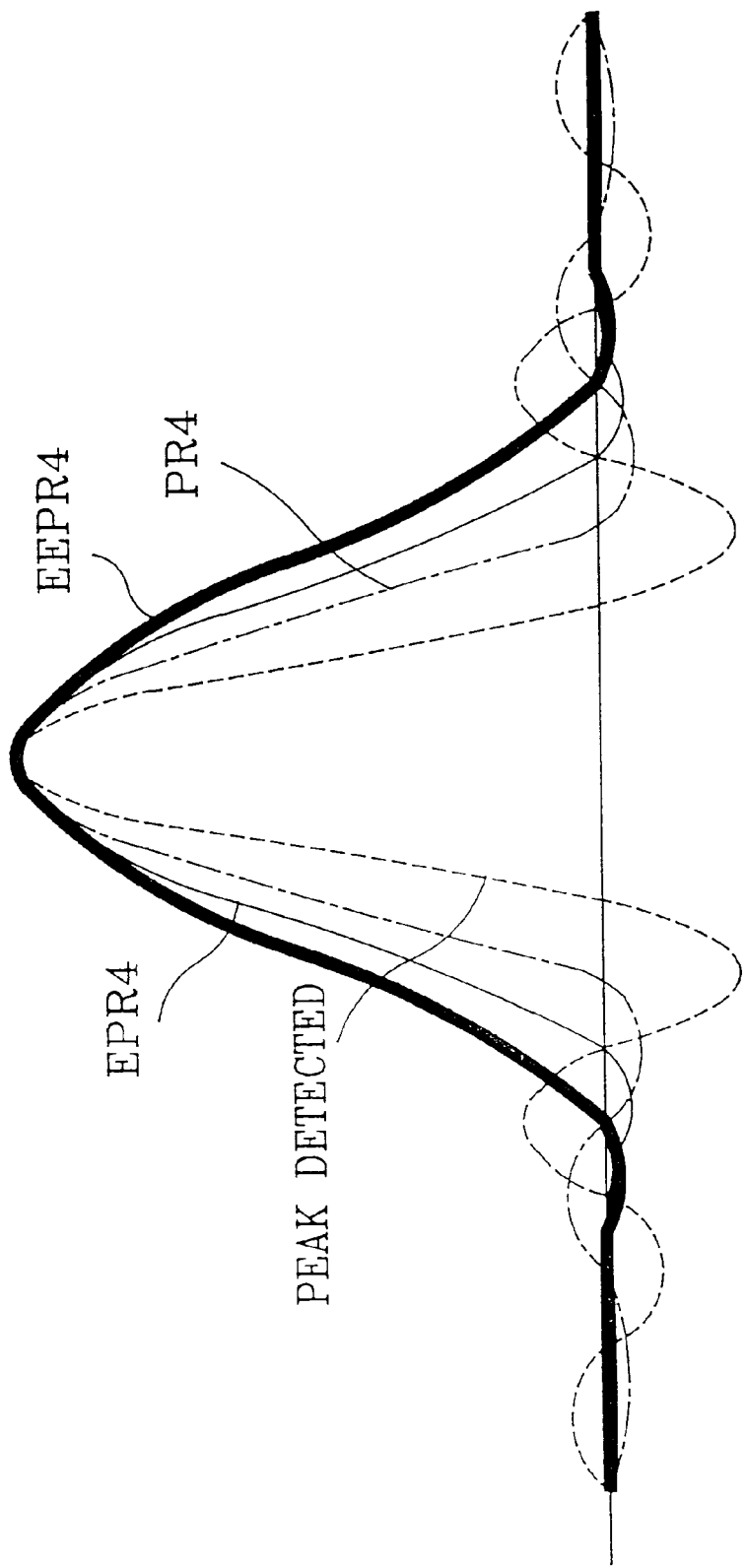
FIG. 5 illustrates a diagram of waveform of an isolated pulse of the PRML method according to channel density.

Referring to FIG. 5, the Dch is varied according to a PRML method. Sampling values of the isolated pulse are abstracted from ADC 44 of the read channel circuit adopting the PRML method and accordingly the pulse width can be predicted. And the most optimized adaptive zone layout is embodied by obtaining an optimized Tch for maintaining the Dch according to the predicted pulse width and the PRML method. The digital sampling value is obtained from the isolated pulse read by the head and the pulse width is calculated from the digital sampling value. And the zone layout is optimized by obtaining the Tch from the pulse width of the read signal. The Tch is calculated as follows:

$$Tch = PW50/Dch \ldots \quad (2)$$

Wherein PW50 is the pulse width. In addition, the data rate of each zone of the disk can be optimized as the data rate is determined by the channel bit period.

Figure 6:
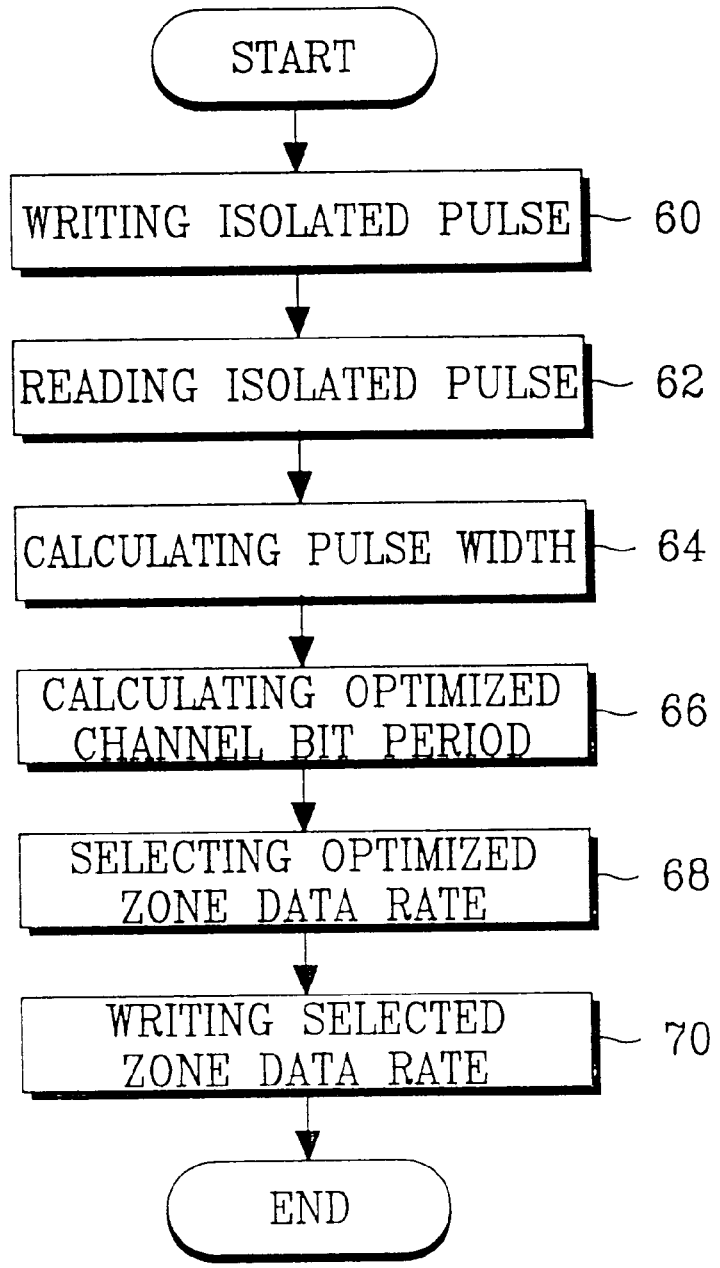
FIG. 6 is a flow chart of control of a microprocessor according to the principles of the present invention.

Hereinafter, the process of optimizing the data rate is described with reference to FIG. 6. Microprocessor 10 writes an isolated pulse corresponding to each zone and head in step 60. Microprocessor 10 then calculates a pulse width by converted a digital sampling value from ADC 34, step 64, after reading the written isolated pulse in step 62. At this period, microprocessor 10 calculates the width of the isolated pulse sampled by using the pulse width table, and the pulse width table is prepared by E1 and E2 value shown in FIG. 4 and equation PW50=Dch×Tch. Microprocessor 10 selects an optimized zone data rate from the zone table, step 68, after calculating an optimized channel bit period by using Eq. (2) in step 66. The zone table is prepared by using appropriate values in a range of data rates usable in a hard disk drive. And then microprocessor 10 writes the zone data rate selected in step 68 on memory and completes the process of optimizing data rate of each zone in step 70. The selected zone data rate can be written on PROM or RAM and also a maintenance area of disk 18.

What is claimed is:

1. A method for laying out an adaptive zone of a hard disk drive adopting a partial response signaling and maximum likelihood (PRML) detection, comprising the steps of:

obtaining a pulse width by reading an isolated pulse written on a disk as a recording medium;

obtaining a channel bit period by calculating the ratio between the channel density according to PRML and said pulse width; and selecting, in response to said channel bit period, the optimum zone data rate from a zone table to record it on a memory.

2. The method as set forth in claim 1, wherein said selected zone data rate can be written on the maintenance area of said disk.

3. The method as set forth in claim 2, wherein said channel bit period is obtained by dividing said pulse width by said channel density.

4. The method as set forth in claim 3, wherein said pulse width is obtained by sampling a read signal obtained by reading said isolated pulse, and calculating the width of the isolated pulse sampled by using a pulse width table prepared according to the sampling values of the read signal according to PRML.

5. The method as set forth in claim 4, wherein said zone table is prepared by using appropriate values in a range of data rates usable in a hard disk drive.

6. The method as set forth in claim 4, wherein said step of writing the selected zone data rate in a memory area comprises writing the selected zone data rate in a PROM.

7. The method as set forth in claim 4, wherein said step of writing the selected zone data rate in a memory area comprises writing the selected zone data rate a maintenance area of the disk.

8. The method as set forth in claim 4, wherein said step of calculating a pulse width of the isolated pulses comprises a step of digitizing the isolated pulses prior to calculating the pulse width.

9. A method for laying out an adaptive zone of a hard disk drive adopting a partial response signaling and maximum likelihood (PRML) detection, comprising the steps of:

writing an isolated pulse onto each zone of a hard disk and each head of the hard disk drive;

reading each of the written isolated pulses;

calculating a pulse width of the isolated pulses;

calculating an optimized channel bit period by using equation Tch=PW50/Dch, wherein Tch is the channel bit period, PW50 is the pulse width at an amplitude of 0.5 and Dch is channel density according to PRML;

selecting an optimized zone data rate from a zone table utilizing the calculated optimized channel bit period; and writing the selected zone data rate in a memory area.

10. The method as set forth in claim 9, wherein said pulse width of the isolated pulse is calculated using a pulse width table.

* * * * *